June 27, 1950 — A. R. WYLIE — 2,513,227
FIELD STRUCTURE FOR ROTATING ELECTRICAL EQUIPMENT
Filed July 11, 1945
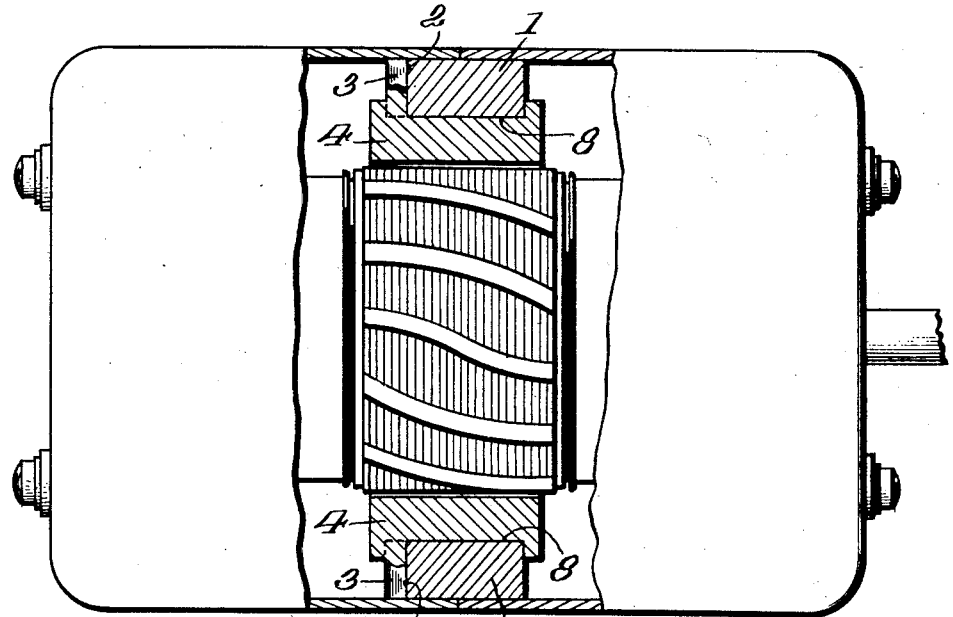
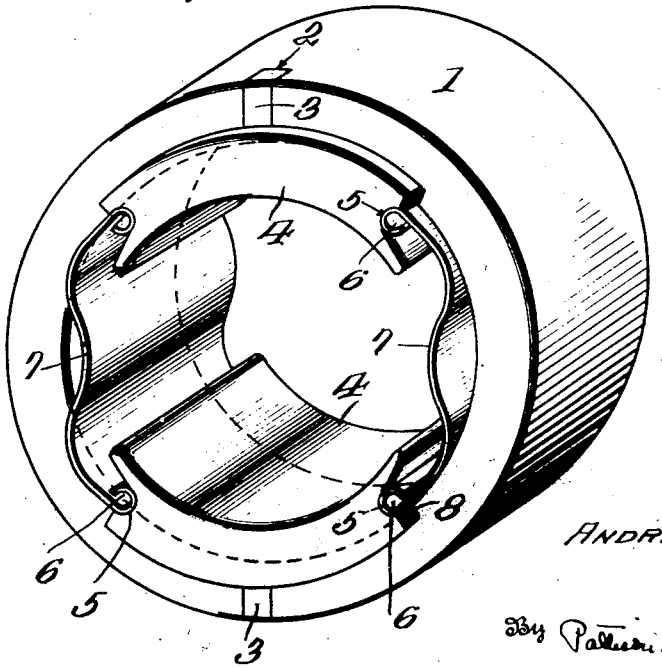
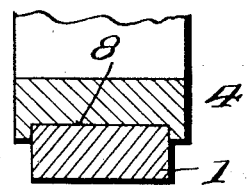
Inventor
ANDREW R. WYLIE Patented June 27, 1950

2,513,227

UNITED STATES PATENT OFFICE 2,513,227

FIELD STRUCTURE FOR ROTATING ELECTRICAL EQUIPMENT

Andrew R. Wylie, Owosso, Mich., assignor, by mesne assignments, to Redmond Company, Inc., Owosso, Mich., a corporation of Michigan Application July 11, 1945, Serial No. 604,343

4 Claims. (Cl. 171—252)

This invention relates to a field structure for rotating electrical equipment and is a companion application to my application filed of even date herewith, the object being to provide a field structure composed of a cylinder or permanent magnet material such as Alnico, in which is disposed oppositely disposed pole pieces formed of soft iron indexed to proper relationship to the permanent magnet cylinder, the pole pieces being held in assembled position by resilient wedges formed of nonmagnetic material.

In the drawings:

Fig. 1 is a side elevation of an electric motor, partly in section, showing my improved construction of field structure.

Fig. 2 is a perspective view of the field structure detached, and

Fig. 3 is a section showing the resilient wedge members in their seats for holding the pole pieces in their proper position.

In the embodiment of my invention as here shown, the permanent magent material is cast into a cylinder 1 and is provided with oppositely disposed notches 2 into which extend the positioning pins 3 of circular pole pieces 4 formed of soft iron indexed to proper relationship to the casting. The pole pieces 4 are provided with seats 5 in the ends of which are disposed the bent end portions 6 of resilient wedges 7 formed of nonmagnetic material. The circular pole pieces are provided with grooves 8 on their outer faces which straddle the cylindrical casting 1 of permanent magnet material, as clearly shown, so that the pole pieces can readily be placed in position or removed from the circular permanent magnet by simply detaching the resilient wedges 7. The pole pieces, after the wedges have been detached, can be moved inwardly so as to disengage the positioning pins from the notches. By having the notches oppositely disposed the pole pieces are properly positioned within the cylinder of permanent magnet material. This enables the permanent magnet material to be cast and used without machining or drilling holes therein.

While I have used the terms "soft iron" for the pole pieces and "Alnico" for the permanent magnet pieces it is of course understood that any suitable material can be used for forming these pieces, as clearly specified in my companion application filed of even date herewith, and therefore I do not wish to limit myself to the use of any particular kind of material in forming the field structure.

The cylinder 1 is adapted to be disposed in a housing 8 of an electric motor in which is disposed an armature assembly 9 of conventional type, as clearly shown. This provides a novel field structure which can be readily assembled in a motor housing and will form a support for the casing thereof.

I claim:

1. A field structure for rotating electrical equipment comprising a body of permanent magnet material cast in the form of a cylinder having oppositely disposed notches, soft iron pole pieces indexed to proper relationship to the casting having positioning lugs arranged within said cylinder, the positioning lugs extending into the notches of said cylinder, resilient means disposed between said pole pieces for holding said pole pieces within said cylinder, and an armature disposed within said cylinder.

2. A field structure for rotating electrical equipment, composed of a body of permanent magnet material cast into the form of a cylinder with oppositely disposed notches, curved pole pieces having grooved outer faces straddling said cylindrical body and provided with positioning lugs cooperating with the notches of said body, and resilient wedges of nonmagnetic material disposed between said pole pieces for holding said pole pieces in position within said cylinder.

3. Field structure for electrical equipment, wherein directly oppositely disposed poles are required; the field structure including a single cylindrical magnet, pole-defining members for the magnet, the members having flanged edges, the distance between the flanges being substantially equal to the height of the cylinder, the members being snugly fitted on the cylinder walls so that the flanges straddle the cylinder ends snugly, and means between the members and the magnet for preventing arcuate displacement of the members with relation to the magnet, the preventing means including means for maintaining the preventing means in functioning relationship.

4. Field structure for electrical equipment, wherein directly oppositely disposed poles are required; the field structure including a single cylindrical magnet, pole-defining members for the magnet, the members having flanged edges, the distance between the flanges being substantially equal to the height of the cylinder, the members being snugly fitted on the cylinder walls so that the flanges straddle the cylinder ends snugly, and means for preventing arcuate displacement of the members with relation to the magnet, the preventing means including means for forcing the members tightly into engagement with the magnet.

ANDREW R. WYLIE.

REFERENCES CITED

The following references are of record in the file of this patent:

UNITED STATES PATENTS

| Number | Name | Date |
|---|---|---|
| 1,269,344 | Wacker | June 11, 1918 |
| 2,265,809 | Korte et al. | Dec. 9, 1941 |